March 12, 1968 F. SCHLOSS 3,372,575
WRAP-AROUND VIBRATION GENERATOR IN A MECHANICAL
IMPEDANCE MEASURING DEVICE
Filed March 31, 1965 2 Sheets-Sheet 1

INVENTOR.
FRED SCHLOSS

March 12, 1968 F. SCHLOSS 3,372,575
WRAP-AROUND VIBRATION GENERATOR IN A MECHANICAL
IMPEDANCE MEASURING DEVICE
Filed March 31, 1965 2 Sheets-Sheet 2

INVENTOR.
FRED SCHLOSS
BY
ATTYS.

United States Patent Office 3,372,575
Patented Mar. 12, 1968

3,372,575
WRAPAROUND VIBRATION GENERATOR IN A MECHANICAL IMPEDANCE MEASURING DEVICE
Fred Schloss, Arlington, Va., assignor to the United States of America as represented by the Secretary of the Navy
Filed Mar. 31, 1965, Ser. No. 444,475
9 Claims. (Cl. 73—67.1)

ABSTRACT OF THE DISCLOSURE

An apparatus for measuring the mechanical impedance of a specimen wherein the vibration generator for the "impedance head" encloses the "impedance head," and the "impedance head" is supported by a vibratable sleeve, which is supported for linear vibratory motion by flexible rings.

---

The invention described herein may be manufactured and used by or for the Government of the United States of America for governmental purposes without the payment of any royalties thereon or therefor.

The present invention relates to vibration generators and more particularly to vibration generators of the "wraparound" type.

The desirability of vibrating various test specimen in order to ascertain their mechanical impedance and other mechanical characteristics has been established. Very briefly, the test sample is vibrated in air or in an other suitable medium and the resultant force and acceleration acting on the test sample is measured. However, difficulties have arisen because the prior art vibrators possess at least one or more of the following disadvantages: large physical size and/or large mass relative to the test specimen. Prior measuring instruments vibrate along lines which are transverse to the desired line of motion or do not physically enclose the impedance head. All of these factors may lead to spurious results.

An object of the present invention is to provide a vibration generator for efficiently enclosing a device which is to be vibrated.

A further object of the invention is to provide an efficient "wraparound" vibration generator for interchangeable mounting of different elements therein.

Another object of the invention is to provide an efficient "wraparound" vibration generator for substantially linear vibratory motion back and forth along a single line without any substantial transverse motion.

Still another object of the invention is to provide a "wraparound" vibration generator having a low dynamic mass.

Still another object of the invention is to provide a "wraparound" vibration generator which can vibrate over a selected frequency band.

Other objects and many of the attendant advantages of this invention will be readily appreciated as the same become better understood by reference to the following detailed description and claims when considered in connection with the accompanying drawings:

Figure 1:
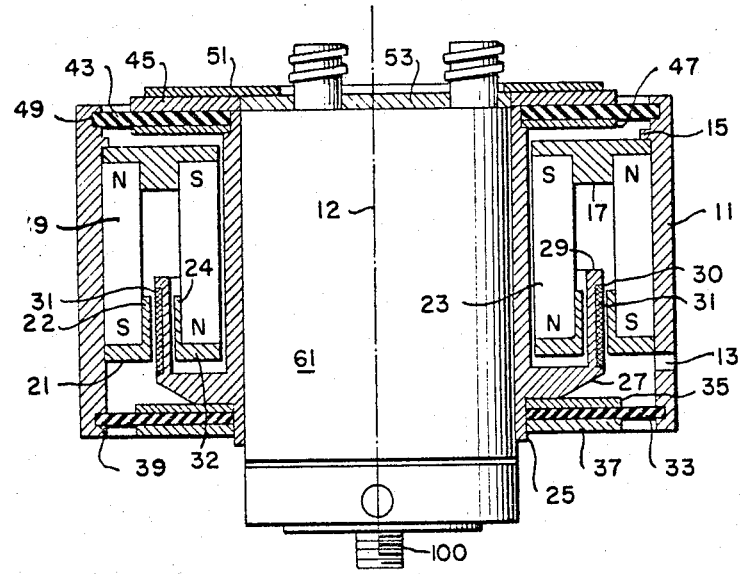
FIG. 1 is a partial sectional view of the instant invention.

Referring to the drawings wherein like reference characters designate like or corresponding parts, the present invention includes, as shown in FIG. 1, a vibration generator having a housing 11 which is preferably cylindrical in shape but which may be of any suitable shape as long as the shape is symmetrical about a central axis 12.

The housing 11 has a radial hole 13 thru which pass nonillustrated equipment-connecting lead wires. The inside of housing 11 is provided with an annular shoulder 15 for providing an attachment point for an annular support member 17, T-shaped in transverse cross section.

A first annular permanent magnet 19 is mounted against the inside of the housing 11 and held in place by the outer surface of the annular support member 17 and by a bottom annular support member 21 L-shaped in transverse cross section and welded to the inside surface of housing 11. A second annular permanent magnetic member 23 located inwardly of magnet 19 is fixedly held in place at one end by the annular support member 17. An inner sleeve member 25 which is made of any suitable light material has a flange formed by a lateral shoulder 27 and an upward extending cylindrical or ring wall 29 having a peripheral groove 30. The groove 30 provides means for mounting a driving coil 31 securely in place.

An annular spacing element 32 is L-shaped in transverse cross section and welded and bonded to the bottom of the inner permanent magnet 23.

A flat ring 33 made of natural rubber or any suitable material having physical characteristics similar to rubber is mounted snugly between a pair of flat, axially spaced support rings 37 and 35 which are fixedly mounted on the sleeve member 25. The inside of the housing 11 contains an annular groove 39 for receiving the outer peripheral edge of the rubber annulus 33.

A second flat ring 43 made out of material like that of ring 33 is snugly fitted between a pair of axially spaced support rings 45 and 47 which are fixedly mounted on the sleeve member 25. The inside of the housing 11 contains an annular groove 49 for supporting the outer peripheral edge of the ring 43. The rubber support annuli 33 and 43 thus provide resilient means for supporting the inner sleeve which supports the driving coil 31 within the housing 11 so that in relation to the housing-supported structural elements the driving coil may freely move up and down between the walls of annular elements 32 and 21. Any transverse vibrational movements of the coil 31 and its supporting body elements 25, 27 are effectively isolated from the housing and housing-supported structure because of the physical characteristics of the rubber annuli 33 and 43 which act in shear transversely as if each rubber sheet were made of many flat layers that slip relatively to each other. The level of transmission of transverse vibrations is thus about 40 db down from the axial level of vibration transmission. Any material which exhibits the above-described effect may be used in place of natural rubber.

Figure 2:
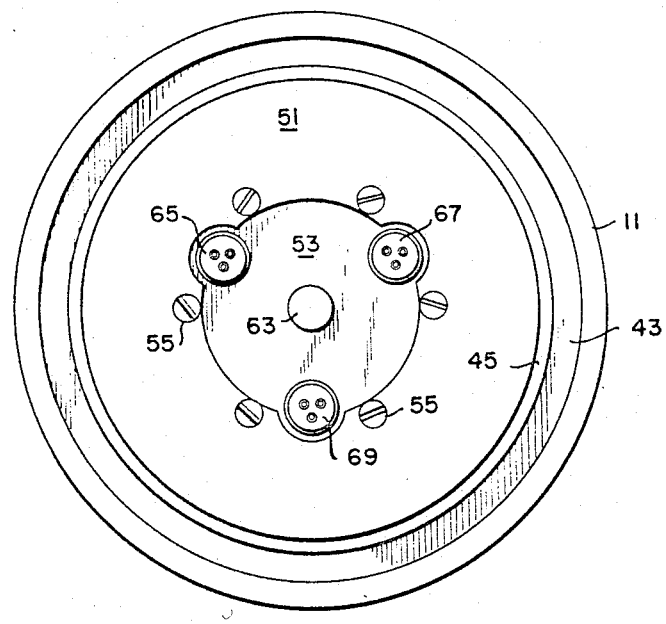
FIG. 2 is a sectional view of the embodiment shown in FIG. 1.

As seen in FIG. 2 in conjunction with FIG. 1 there is further provided for the unit an external mounting disc 51 fixedly attached to the support annulus 45. An adaptor ring 53 fitting within the sleeve 25 is fixedly attached to the adaptor ring 51 by way of screws 55. An impedance head 61 or other device to be vibrated is mounted within the sleeve 25 and held in place by a screw 63. A suitable type of impedance head which may be employed is disclosed in Letters Patent 3,162,039 issued to the present inventor. Connectors 65, 67 and 69 are provided for making electrical connection to the unit. The test specimen to be vibrated is attached to the opposite end of the impedance head by stud 100 or other conventional fastening means.

The coil 31 is supplied with alternating current the frequency of which may be from 20 cycles per second to 10,000 cycles per second, by means of any suitable well-known audio frequency generator (not illustrated). The alternating current passing through the coil 31 causes an alternating electromagnetic force to be generated by the coil 31. This alternating electromagnetic force reacting against the magnetic force of permanent magnets 19 and 23 causes the coil 31, ring portion 29, shoulder 27 and sleeve member 25 to vibrate back and forth along a single line parallel to axis 12 at the frequency of the alternating current being supplied. This in turn causes the impedance head 61 to vibrate by virtue of mechanical reaction. The rubber discs 33 and 43 assure vibrational decoupling between the housing 11 and the sleeve 25 in all directions. Any motion that may occur transverse to the motion along said single line and is down more than 40 db from that transmitted axially.

Figure 3:
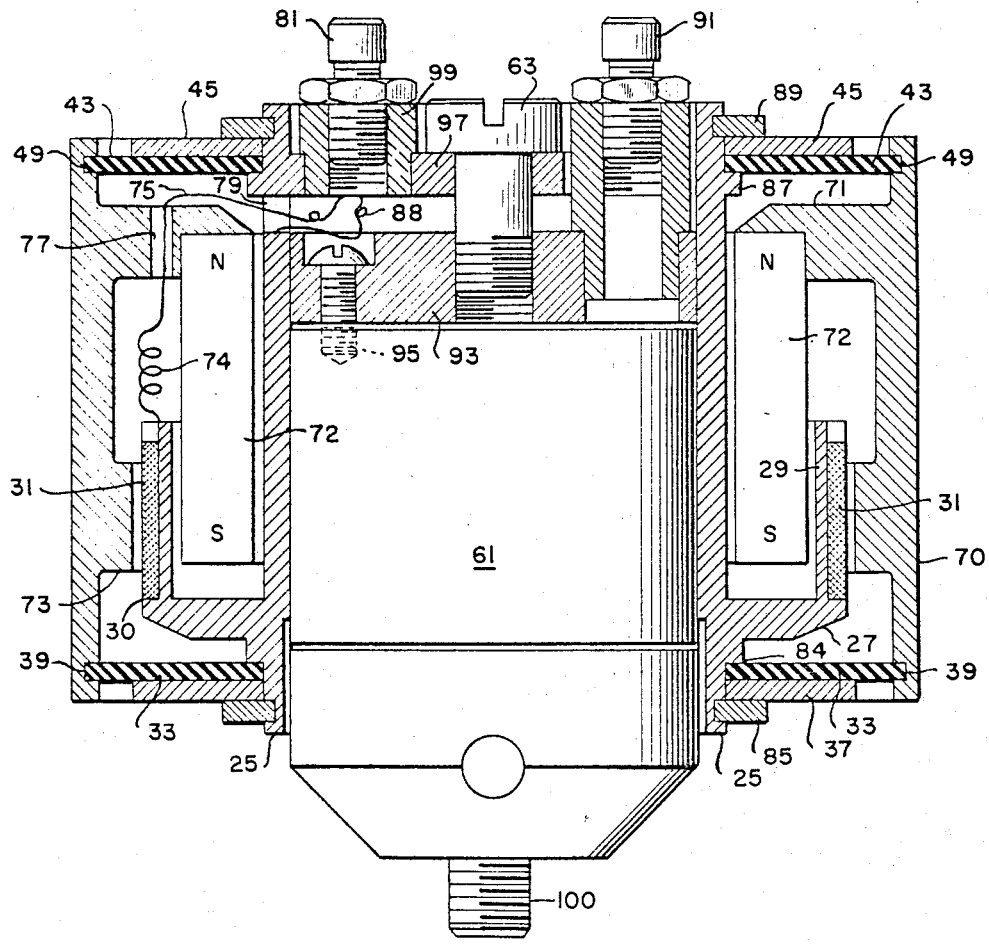
FIG. 3 is a partial sectional view of another embodiment of the instant invention.

Referring to the embodiment shown in FIG. 3, a cylindrical housing 70 is provided with an inward extending annular shoulder 71 for mounting an annular shaped permanent magnet 72. An annular, inwardly protruding ridge 73 is provided on the inside of the housing 70 to serve as a spacing or stop member for an annular driving coil 31.

Similarly to the embodiment of FIG. 1, there is provided a central sleeve element 25 adjacent an impedance head 61. The sleeve element 25 has a shoulder 27 and a cylindrical wall 29 having a recessed portion 30 on its outer periphery.

Rubber ring supports 33 and 43 are provided in the same manner as shown in FIG. 1, although as later described, they are supported in the sleeve in a slightly different manner.

The driving coil 31 has one of its ends connected to a lead 75 for supplying the alternating current from the generator and its other end connected to the metallic shoulder 27. The lead 75 is fed through a hole 77 in the shoulder 71, to a hole 79 in the sleeve 25 to the coupling member 81. The lead 75 is provided with a few coils 74 to better endure the effects of the vibrations. A second wire lead 83 is electrically connected to the metallic sleeve member 25.

The flat rubber ring 33 is held against an annular lip 84 by the support disc 37 which is held in place by an annular key 85. The key 85 fits in an annular groove in the sleeve 25. The flat rubber ring 33 is mounted in the annular groove 39 of the housing 70. The second rubber ring 43 is mounted against an annular ridge 87 by a support ring 45. The support ring is held in place by an annular key 89. The rubber disc 43 is mounted in the annular groove 49 of the housing 70. The non-illustrated lead wires from the impedance head 61 are connected to a connecting member 91.

A mounting plate 93 is provided for supporting the impedance head 61 within the sleeve 25. The impedance head is held to a mounting plate 93 by way of a screw 95. The electrical connecting member 91 is fixedly attached to the mounting plate 93. The sleeve 25 carries a disc like portion 97 through which an axial screw 63 is fastened. This screw prevents the unit from being pulled apart. An insulating bushing 99 is utilized to support the coupling member 81.

The operation of the embodiment illustrated in FIG. 3 is similar to the embodiment illustrated in FIG. 1. The FIG. 3 embodiment provides some simplification over FIG. 1 and requires only one permanent magnet.

It will be understood that various changes in the details, proportions and arrangements of parts, which have been herein described and illustrated in order to explain the nature of the invention, may be made by those skilled in the art within the principle and scope of the invention as expressed in the appended claims.

I claim:

1. A wraparound vibration generator for vibrating a specimen comprising:
   housing means;
   sleeve means enclosed by said housing means and concentric therewith;
   means mounting said sleeve means within said housing means, said means comprising a sheet of material having rubber-like characteristics;
   means for vibrating said sleeve along a line perpendicular to said mounting sheet and relative to said housing means, said vibration means comprising magnet means attached to said housing means and coil means attached to said sleeve means; and
   an impedance head mounted within and attached to said sleeve means and having means for attachment of a specimen thereto.

2. A wraparound vibration generator for vibrating a specimen comprising:
   housing means;
   sleeve means enclosed by said housing means and concentric therewith;
   means for mounting said sleeve means within said housing means and comprising first and second rubber-like sheets, said first sheet being positioned at one end of said sleeve means and said housing means and said second sheet being positioned at the other end of said sleeve means and said housing means;
   means for vibrating said sleeve means along a line perpendicular to said sheets and relative to said housing means, said vibrating means comprising magnet means attached to said housing means and coil means attached to said sleeve; and
   an impedance head mounted within and attached to said sleeve means and having means for attachment of a specimen thereto.

3. A wraparound vibration generator as defined in claim 2 but further characterized by said magnetic means comprising a first annular permanent magnet.

4. A wraparound vibration generator as defined in claim 2 wherein said magnetic means comprises a first annular permanent magnet and a second smaller annular permanent magnet mounted concentric to and spaced from said first annular permanent magnet, said coil means being positioned between said magnets.

5. A wraparound vibration generator as defined in claim 4 but further characterized by electrical connecting means for connecting the unit to a source of power having a frequency of operation in the audio range.

6. A wraparound vibration generator as defined in claim 5 but further characterized by said first and second rubber-like sheets each being provided with a first and second supporting means for partially enclosing said rubber-like sheets, said supporting means being attached to said inner sleeve means.

7. Apparatus according to claim 6 wherein each of said rubber-like sheets is annular, the inner peripheries thereof being attached to said sleeve means by said support means and the outer peripheries being attached to said housing means.

8. Apparatus according to claim 7 wherein said housing means and sleeve means are concentric cylinders arranged about an axis common to said rubber-like sheets.

9. Apparatus according to claim 8 wherein each of said rubber-like sheets are constituted of natural rubber.

UNITED STATES PATENTS

References Cited

| | | | |
|---|---|---|---|
| 2,179,925 | 11/1939 | Dilg | 310—27 X |
| 2,355,194 | 8/1944 | Wiggins | 73—67.1 |
| 2,776,560 | 1/1957 | Erath et al. | 73—71.2 |
| 3,162,039 | 12/1964 | Schloss | 73—67.1 |

RICHARD C. QUEISSER, *Primary Examiner.*

JOHN P. BEAUCHAMP, *Examiner.*